W. B. NICKELSON.
Cheese Hoop.
No. 59,630. Patented Nov. 13, 1866.
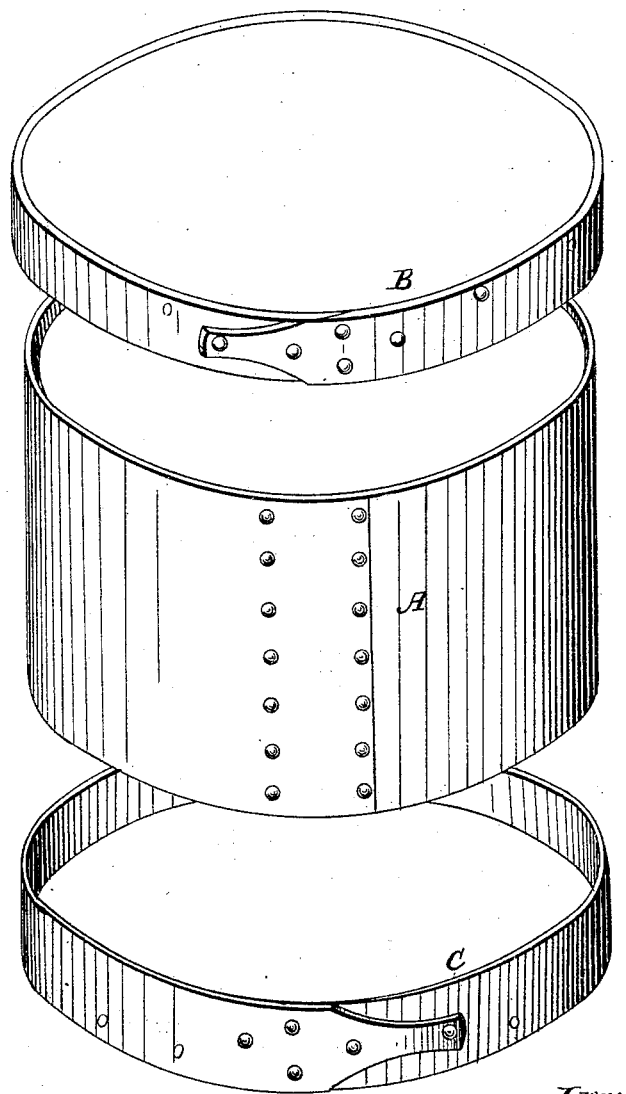
Witnesses
Solon C. Kemon
E. A. Ellsworth
Inventor:
William B. Nickelson
per Munn & Co
Attys.

UNITED STATES PATENT OFFICE.

WILLIAM B. NICKELSON, OF LOWVILLE, NEW YORK.

IMPROVEMENT IN HOOPS FOR CURING AND PACKING CHEESE.

Specification forming part of Letters Patent No. 59,630, dated November 13, 1866.

*To all whom it may concern:*

Be it known that I, WM. B. NICKELSON, of Lowville, in the county of Lewis and State of New York, have invented a new and Improved Case for Curing and Packing Cheese; and I do hereby declare the following to be a full, clear, and exact description of the same, sufficient to enable one skilled in the art to which the invention appertains to make use of it, reference being had to the accompanying drawing, which forms a part of this specification, and in which my invention is represented by a perspective view.

The cheese is cured in a hoop instead of bandages, the hoop serving as a permanent covering for the circumference of the cheese, and, in connection with a cover at each end, as a box for turning, storage, and transportation.

The hoop answers the purpose much better than a cloth or bandage for several reasons. The cheese dries equally, and does not dry out or become hard for a distance in from the circumference. All the expense of the cloth is saved, as a box must be provided in any event for the transportation of the cheese, and this curing-hoop accompanies the box. It is true that two covers are required for the box under my arrangement; but this extra cost is more than compensated by the saving in weight and quality by preventing the drying out of the cheese on its circumference.

In the drawing, A is the hoop; B C, the covers. The latter are removable at pleasure.

The cheese need not fill out the vertical height of the hoop.

A dairy of eight hundred cows will entail an expense of $300 per annum for bandages for the cheeses, and this may be saved and the work better performed.

In turning cheeses while curing, it is very convenient, as, in connection with the lids, the cheese is saved from casual injuries and defacement. The same is true in regard to piling them up in store, which is done to some extent before boxing.

Having described my invention, what I claim as new, and desire to secure by Letters Patent, is—

The hoop as a covering for the circumference of the cheese in lieu of bandages in curing, and, in connection with covers, serving as a box for the cheese during turning, storage, and transportation, substantially as described.

To the above specification of my improved case for curing and packing cheese I have signed my hand this 20th of October, 1866.

WM. B. NICKELSON.

Witnesses:
SOLON C. KEMON,
A. TANNER.